H. L. WITT & S. LOOKMAN.
CIRCUIT CLOSER.
APPLICATION FILED DEC. 3, 1915.
1,198,804.
Patented Sept. 19, 1916.
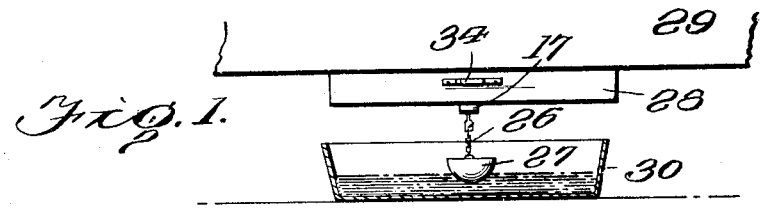
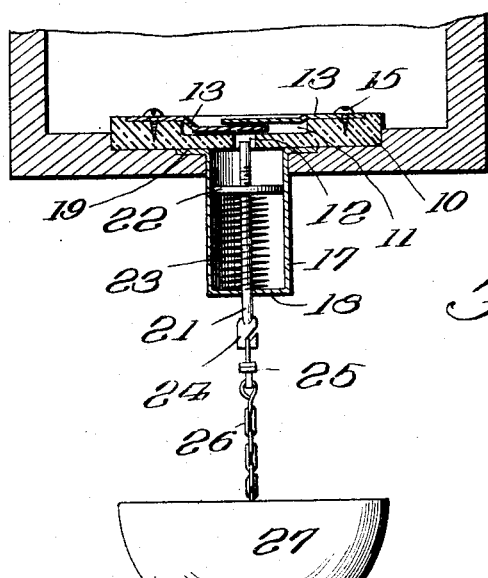
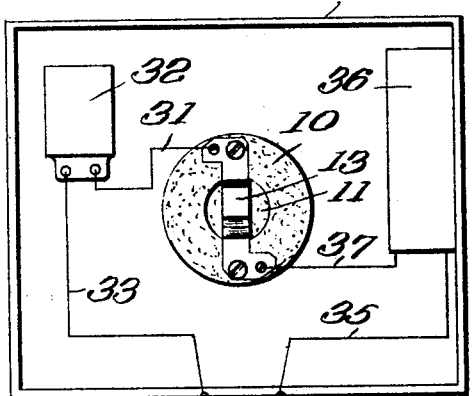
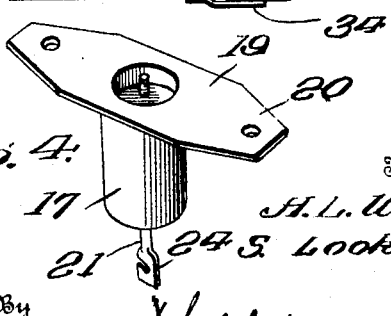
Inventors
H. L. Witt and
S. Lookman.
By
_____, Attorneys.

UNITED STATES PATENT OFFICE.

HARRY L. WITT AND SAMUEL LOOKMAN, OF PITTSBURGH, PENNSYLVANIA; SAID LOOKMAN ASSIGNOR TO SAID WITT.

CIRCUIT-CLOSER.

1,198,804.  Specification of Letters Patent.  Patented Sept. 19, 1916.

Application filed December 3, 1915.  Serial No. 64,918.

*To all whom it may concern:*

Be it known that we, HARRY L. WITT and SAMUEL LOOKMAN, citizens of the United States, residing at Pittsburgh, in the county of Allegheny and State of Pennsylvania, have invented certain new and useful Improvements in Circuit-Closers, of which the following is a specification.

This invention relates to circuit closers and has to do particularly with improvements in the structure disclosed in our pending application for water level alarm, filed Feb. 4, 1915, Serial No. 6,095.

The invention has as its primary object to provide a circuit closer adapted for automatic operation by a float and which may be used in connection with a water level alarm for the drip pan of a refrigerator.

The invention has as a further object to provide a circuit closer which will be positive in its operation and wherein the coacting contact members employed will be securely held against shifting movement relative to each other in coöperative relation.

A still further object of the invention is to provide an improved circuit closer having a spring actuated plunger normally arranged to close a circuit between the contact members and adapted to support the float and wherein the head of the plunger will be adjustable upon the stem thereof to regulate the tension of the spring relative to the weight of the float so that the automatic movement of the plunger to close the circuit between said contact members may be readily adjusted and further so that floats of various sizes may be employed and compensation made for any difference in weight therebetween. And the invention has as a still further object to provide a construction wherein the plunger and the spring associated therewith will be mounted within a casing and wherein the said casing may, when desired, be easily detached from the body of the circuit closer so that the said spring may be readily renewed.

Other and incidental objects will appear as the description proceeds and in the drawings wherein we have illustrated the preferred embodiment of the invention and wherein similar reference characters designate corresponding parts throughout the several views, Figure 1 is a fragmentary side elevation showing our improved circuit closer in connection with a drip pan which is illustrated in section, Fig. 2 is a vertical sectional view more particularly showing the construction of the circuit closer and illustrating the manner in which the device is mounted within a casing for a suitable alarm, Fig. 3 is a perspective view showing the circuit closer detached with the float removed therefrom and particularly illustrating the mounting of the coacting contact members of the circuit closer, Fig. 4 is a perspective view showing the casing for the plunger detached from the body of the device, the float being removed from the plunger, Fig. 5 is a diagrammatic view illustrating our improved circuit closer in connection with an alarm system, and Fig. 6 is a sectional view partly broken away showing a slightly modified construction in the mounting of the casing for the plunger.

In carrying out our invention, the body portion of the device is formed of a disk 10 of insulating material which may be formed of fiber or any other suitable substance and is provided upon one side thereof with an annular recess 11 communicating centrally with which is an opening 12 through the disk.

Mounted upon the upper face of the disk 10 at opposite sides of the opening 11 thereof, are coacting contact members 13. Each of these members is preferably formed from a single piece of suitable resilient sheet metal provided at one extremity with an enlarged and laterally directed head 14 countersunk in the upper face of the disk 10 and secured thereto by a screw or other suitable fastening device 15 as more particularly shown in Figs. 2 and 3. The free extremities of the contact member 13 are offset to project into the recess 11 of the disk and are arranged entirely within the lines thereof to extend over the opening 12 in spaced overlapping relation.

It will now be noted that should the disk be mounted with its upper face seating directly against the wall of a casing or other support, the movement of the contact members 13 to coact with each other will be unhampered. It will be noted, furthermore, that the laterally directed heads 14 of the contact members, in being countersunk within the upper face of the disk 10 will act to prevent any lateral shifting movement of the said contact members relative to each other so that at all times, the free ends of the said contact members will be maintained in coöperative relation. Formed in the outer ends of the heads 14, are screw threaded openings 16 adapted to removably receive a binding post for making electrical connection with the contact members.

Detachably secured to the lower face of the disk 10 is a cylindrical casing 17 which, at its outer extremity is closed by an end wall 18 and is open at its inner extremity to surround the opening 12 in the disk. The inner extremity of the casing 17 is provided with an overhanging attaching head 19 which seats flatly against the lower face of the disk 10 and terminates at its extremities in attaching lugs 20 formed to receive screws or other suitable fastening devices for connecting the casing with the disk. The head 19 as will be observed is adapted to maintain the casing 17 in axial alinement with the opening 12 while, when desired, the casing may be readily disconnected from the disk.

Mounted within the casing 17 is a plunger which is provided with a stem 21 arranged axially of the casing and freely fitted through a suitable opening formed in the end wall thereof. The stem 21 is shiftable to project at its inner extremity through the opening 12 in the disk 10 to engage the innermost contact member 13 immediately overlying the said opening for flexing the said contact member to engage the other contact member 13 and close a circuit therethrough. Screw threaded upon the stem 21 of the plunger and freely fitted within the casing 17, is a head 22 between which and the end wall 18 of the plunger is arranged a helical spring 23 which surrounds the stem of the plunger. The spring 23 is normally adapted to urge the plunger toward the contact members to close a circuit therebetween.

At its outer extremity, the stem 21 of the plunger is flattened to provide a head 24 having an inclined slot opening through one edge thereof and adapted to removably receive the terminal link or catch 25 of a chain 26. Connected to the outer extremity of the chain 26 is a semi-spherical float 27 which may be formed of any suitable material and is arranged with its flat face presented toward the stem 21 of the plunger, the chain 26 providing a flexible connection between the float and the plunger. By releasing the catch 25 or by simply sliding the catch out of the slot in the head 24 of the stem 21 of the plunger, the float may, when desired, be easily disconnected from the plunger.

The float 27 will normally swing free from the stem 21 and will gravitate against the tension of the spring 23, the float acting to depress the plunger within the casing 17 against the action of the said spring and consequently move the stem 21 of the plunger away from the contact members 13. Particular attention is now directed to the fact that by positioning the head 22 of the plunger longitudinally upon the stem 21 thereof, the tension upon the spring 23 may be regulated so that the instant of contact between the stem of the plunger and the innermost of the contact members 13 to close a circuit through the contact members may be easily adjusted with relation to the weight of the float. Moreover, by this construction, compensation may be made for any difference in weight between different floats so that the instant of contact between the stem of the plunger to close a circuit through the contact members may be maintained the same in connection with each of a various number of floats of different weights or sizes. Thus, a larger and heavier float may be readily substituted for the float 27 without affecting the operation of the device.

In Fig. 1 of the drawings, we have illustrated our improved circuit closer in connection with the casing 28 of an alarm, the casing being illustrated as secured to the bottom of a refrigerator conventionally shown at 29 with the float 27 arranged to depend into a pan 30. In connecting the circuit closer with the casing 28, an opening is formed in the bottom wall of the casing to receive the casing 17 of the circuit closer which is arranged to project through the said opening with the disk 10 arranged within the casing. The bottom wall of the casing 28 is recessed to receive the said disk, which is thus partly countersunk into the said bottom wall and is provided with suitable openings 31 adapted to receive screws or other suitable fastening devices detachably securing the disk to the alarm casing. By this arrangement, the circuit closer may, when desired, be bodily disconnected from the casing 28 by simply first removing the float 27. The purpose of providing a semispherical float will now become apparent since it will be seen that by this construction, the chain 26 may be made relatively longer than were a spherical float employed so that even though there may be but very little space between the top edge of the pan 30 and the casing 28, as shown in Fig. 1, the length of the chain will be such as to readily permit the float to move over the top edge of the pan when the pan is slid from beneath the refrigerator.

In Fig. 5 of the drawings we have shown a diagrammatic view of the alarm for the circuit closer which is arranged within the casing 28. A wire 31' leads from one of the contact members 13 to one terminal of a bell or other annunciator 32. Leading from the other terminal of the bell is a wire 33 which is connected to one terminal of a switch 34 arranged upon the outer side of the casing 28. Leading from the other terminal of the switch 34, is a wire 35 which is connected to one terminal of a battery or other suitable source of electrical energy 36. Connected to the other terminal of the battery and leading to the other contact member 13, is a wire 37. When the plunger of the circuit closer moves upwardly within the casing 17 to close the circuit between the contact members 13 current will flow from the battery 36 through the wire 37, thence through the said contact members and through the wire 31 to the bell 32 to sound the bell. From the bell 32 current will then flow through the wire 33 and through the switch 34 to the wire 35 to return to the battery and thus complete the circuit. When the switch is closed, our improved circuit closer will, when the float is lifted, automatically act to sound the bell 32. By manually operating the switch 34, the alarm will be rendered inoperative.

In Fig. 6, we have shown a slight modification in the mounting of the casing 17 of the circuit closer wherein the said casing adjacent its inner extremity, is screw threaded into the disk 10 to be detachably connected thereto. This arrangement will eliminate the use of the attaching head 19 shown in the preferred form of the invention and it will be noted that the disk is cut away to provide an annular shoulder 38 against which the inner end of the casing is adapted to abut so that the casing will be firmly connected to the disk. Otherwise this modified structure is identical with the preferred form of the invention.

Having thus described our invention, what we claim and desire to secure by Letters Patent is:

1. A circuit closer including a body provided with a recess, coacting contact members secured to the body and having their free extremities offset to extend into said recess in spaced coöperative relation, a plunger carried by the body and provided with a stem normally urged to a position projected into said recess to move the free extremities of said contact members into engagement with each other for closing a circuit therebetween, and means carried by the stem of the plunger for normally holding the plunger in open circuit position away from said contact members.

2. A circuit closer including a body provided with a recess, coacting contact members provided with laterally directed arms seated in the body and connected thereto with the free extremities of said contact members projecting into said recess in spaced coöperative relation, a plunger carried by the body and provided with a stem normally urged to a position projected into said recess to move the free extremities of said contact members into engagement with each other for closing a circuit therebetween, and means carried by the plunger for normally holding it away from said contact members.

3. A circuit closer including coacting contact members, a plunger, yieldable means normally urging the plunger to engage one of the said members for closing a circuit between the contact members, means for normally holding the plunger in open circuit position away from the contact members, and a head carried by the plunger and movable with respect thereto for adjusting the instant of contact between the plunger and said contact member.

4. A circuit closer including a body provided with a recess upon one side thereof and having an opening entering through its opposite side and communicating with said recess, coacting contact members secured to the body upon opposite sides of said recess and having their extremities extending into the recess in coöperative spaced relation, a casing connected to the body upon its side opposite the said recess to surround the said opening, a plunger carried by the casing and including a stem and a head, yieldable means arranged within the casing to engage the head of the plunger for normally urging the stem to project through the said opening to engage one of said contact members for moving it to a position to engage the other contact member and close the circuit between the said members, and means carried by the plunger for normally holding the stem thereof in open circuit position away from the said contact member.

In testimony whereof, we affix our signatures.

HARRY L. WITT. [L. S.]
SAMUEL LOOKMAN. [L. S.]

Copies of this patent may be obtained for five cents each, by addressing the "Commissioner of Patents, Washington, D. C."